(12) United States Patent
Shen et al.

(10) Patent No.: US 11,606,302 B2
(45) Date of Patent: Mar. 14, 2023

(54) METHODS AND APPARATUS FOR FLOW-BASED BATCHING AND PROCESSING

(71) Applicant: Apple Inc., Cupertino, CA (US)

(72) Inventors: Wei Shen, Cupertino, CA (US); Sandeep Nair, San Jose, CA (US); Vidhi Goel, Cupertino, CA (US); Francesco R. Dimambro, Cupertino, CA (US); Eric Tsz Leung Cheng, Cupertino, CA (US); Cahya Adiansyah Masputra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/346,115

(22) Filed: Jun. 11, 2021

(65) Prior Publication Data

US 2021/0392080 A1 Dec. 16, 2021

Related U.S. Application Data

(60) Provisional application No. 63/038,520, filed on Jun. 12, 2020.

(51) Int. Cl.
*H04L 47/22* (2022.01)
*H04L 47/35* (2022.01)
(Continued)

(52) U.S. Cl.
CPC .......... *H04L 47/22* (2013.01); *H04L 47/2483* (2013.01); *H04L 47/32* (2013.01); *H04L 47/35* (2013.01)

(58) Field of Classification Search
None
See application file for complete search history.

(56) References Cited

U.S. PATENT DOCUMENTS 4,805,137 A  2/1989  Grant et al.
4,949,299 A  8/1990  Pickett
(Continued)

FOREIGN PATENT DOCUMENTS

EP  3013008 A1  4/2016
JP  H02306082 A  12/1990
(Continued)

OTHER PUBLICATIONS

Moon-Sang Lee, Joonwon Lee and S. Maeng, "Context-aware address translation for high-performance SMP cluster system," 2008u IEEE International Conference on Cluster Computing, Tsukuba, 2008, pp. 292-297, doi: 10.1109/CLUSTR.2008.4663784. (Year: 2008).

(Continued)

*Primary Examiner* — Anh Ngoc M Nguyen
(74) *Attorney, Agent, or Firm* — Sterne, Kessler, Goldstein & Fox P.L.L.C.

(57) ABSTRACT

Techniques are provided for managing a user space protocol stack are disclosed herein. A nexus in a kernel space can receive a packet from a packet pool, and extract information from the packet to generate a flow key indicating a particular flow for the packet. The nexus can further look up the flow key in a flow table to determine whether there is an existing flow key stored in the flow table matching the flow key of the packet, and store the packet into a batch of packets of the existing flow when the existing flow key matches the flow key of the packet. When a release condition being met, the nexus can release the batch of packets of the existing flow to a user space protocol stack within a user space application through a channel communicatively coupled to the nexus and the user space protocol stack.

20 Claims, 15 Drawing Sheets

(51) Int. Cl.
*H04L 47/32* (2022.01)
*H04L 47/2483* (2022.01)

(56) References Cited

U.S. PATENT DOCUMENTS

| | | | |
|---|---|---|---|
| 5,367,688 | A | 11/1994 | Croll |
| 5,467,459 | A | 11/1995 | Alexander et al. |
| 5,485,578 | A | 1/1996 | Sweazey |
| 5,506,968 | A | 4/1996 | Dukes |
| 5,613,086 | A | 3/1997 | Frey et al. |
| 5,659,542 | A | 8/1997 | Bell et al. |
| 5,708,779 | A | 1/1998 | Graziano et al. |
| 5,731,973 | A | 3/1998 | Takaishi et al. |
| 5,850,395 | A | 12/1998 | Hauser et al. |
| 5,903,564 | A | 5/1999 | Ganmukhi et al. |
| 5,943,507 | A | 8/1999 | Cornish et al. |
| 6,008,992 | A | 12/1999 | Kawakami |
| 6,032,179 | A | 2/2000 | Osborne |
| 6,216,178 | B1 | 4/2001 | Stracovsky et al. |
| 6,233,702 | B1 | 5/2001 | Horst et al. |
| 6,260,152 | B1 | 7/2001 | Cole et al. |
| 6,349,355 | B1 | 2/2002 | Draves et al. |
| 6,359,863 | B1 | 3/2002 | Varma et al. |
| 6,411,997 | B1 | 6/2002 | Dawes et al. |
| 6,485,081 | B1 | 11/2002 | Bingle et al. |
| 6,523,073 | B1 | 2/2003 | Kammer et al. |
| 6,553,446 | B1 | 4/2003 | Miller |
| 6,693,895 | B1 | 2/2004 | Crummey et al. |
| 6,815,873 | B2 | 11/2004 | Johnson et al. |
| 6,874,075 | B2 | 3/2005 | Jerding et al. |
| 6,948,094 | B2 | 9/2005 | Schultz et al. |
| 6,973,701 | B2 | 12/2005 | Momoda et al. |
| 6,990,594 | B2 | 1/2006 | Kim |
| 7,013,536 | B2 | 3/2006 | Golden et al. |
| 7,032,282 | B2 | 4/2006 | Powell et al. |
| 7,100,020 | B1 | 8/2006 | Brightman et al. |
| 7,111,307 | B1 | 9/2006 | Wang |
| 7,127,600 | B2 | 10/2006 | Zimmer et al. |
| 7,152,231 | B1 | 12/2006 | Galluscio et al. |
| 7,281,172 | B2 | 10/2007 | Chujo |
| 7,397,774 | B1 | 7/2008 | Holland et al. |
| 7,398,382 | B2 | 7/2008 | Rothman et al. |
| 7,403,542 | B1 | 7/2008 | Thompson |
| 7,506,084 | B2 | 3/2009 | Moerti et al. |
| 7,509,391 | B1 | 3/2009 | Chauvel et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,681,012 | B2 | 3/2010 | Verma et al. |
| 7,685,476 | B2 | 3/2010 | Andre et al. |
| 7,802,256 | B2 | 9/2010 | Havens |
| 7,853,731 | B1 | 12/2010 | Zeng |
| 7,899,941 | B2 | 3/2011 | Hendry et al. |
| 7,941,682 | B2 | 5/2011 | Adams |
| 8,214,707 | B2 | 7/2012 | Munson et al. |
| 8,230,248 | B2 | 7/2012 | Dance et al. |
| 8,239,947 | B1 | 8/2012 | Glick et al. |
| 8,255,725 | B2 | 8/2012 | Shimazaki et al. |
| 8,352,624 | B2 | 1/2013 | Zimmerman et al. |
| 8,468,285 | B2 | 6/2013 | Kobayashi |
| 8,555,099 | B2 | 10/2013 | Marinkovic et al. |
| 8,561,090 | B2 | 10/2013 | Schneider |
| 8,635,412 | B1 | 1/2014 | Wilshire |
| 8,656,228 | B2 | 2/2014 | Check et al. |
| 8,769,168 | B2 | 7/2014 | Moertl et al. |
| 8,788,822 | B1 | 7/2014 | Riddle |
| 8,799,537 | B1 | 8/2014 | Zhu et al. |
| 8,806,640 | B2 | 8/2014 | Wang |
| 8,819,386 | B1 | 8/2014 | Mather |
| 8,848,809 | B2 | 9/2014 | Whitby-Strevens |
| 8,855,120 | B2 | 10/2014 | Robbins |
| 8,876,062 | B1 | 11/2014 | Baghdasarian |
| 9,049,179 | B2 | 6/2015 | Luna |
| 9,130,864 | B2 | 9/2015 | Keith |
| 9,135,059 | B2 | 9/2015 | Ballard et al. |
| 9,152,580 | B1 | 10/2015 | Chau et al. |
| 9,170,957 | B2 | 10/2015 | Touzni et al. |
| 9,280,360 | B2 | 3/2016 | Xu et al. |
| 9,319,090 | B2 | 4/2016 | Whitby-Strevens |
| 9,544,069 | B2 | 1/2017 | Whitby-Strevens et al. |
| 9,547,535 | B1 | 1/2017 | Wilt |
| 9,594,718 | B2 | 3/2017 | Kaushik et al. |
| 9,769,756 | B1 | 9/2017 | Cui et al. |
| 9,830,289 | B2 | 11/2017 | Pulyala et al. |
| 9,910,475 | B2 | 3/2018 | Kurts et al. |
| 9,913,305 | B2 | 3/2018 | Pinheiro et al. |
| 9,932,757 | B2 | 4/2018 | Hager |
| 9,959,124 | B1 | 5/2018 | Herbeck et al. |
| 9,985,904 | B2 | 5/2018 | Shalev et al. |
| 10,078,361 | B2 | 9/2018 | Sanghi et al. |
| 10,230,608 | B2 | 3/2019 | Tsirkin |
| 10,289,555 | B1 | 5/2019 | Michaud et al. |
| 10,331,600 | B1 | 6/2019 | Rajadnya et al. |
| 10,331,612 | B1 | 6/2019 | Petkov et al. |
| 10,534,601 | B1 | 1/2020 | Venkata et al. |
| 10,678,432 | B1 | 6/2020 | Dreier et al. |
| 10,798,059 | B1 | 10/2020 | Singh et al. |
| 10,798,224 | B2 | 10/2020 | Masputra et al. |
| 10,819,831 | B2 | 10/2020 | Masputra et al. |
| 10,999,132 | B1 | 5/2021 | Sagar et al. |
| 11,095,758 | B2 | 8/2021 | Masputra et al. |
| 11,146,665 | B2 | 10/2021 | Masputra et al. |
| 11,159,651 | B2 | 10/2021 | Masputra et al. |
| 11,178,259 | B2 | 11/2021 | Masputra et al. |
| 11,178,260 | B2 | 11/2021 | Masputra et al. |
| 11,212,373 | B2 | 12/2021 | Masputra et al. |
| 11,368,560 | B2 | 6/2022 | Masputra et al. |
| 2001/0037410 | A1 | 11/2001 | Gardner |
| 2002/0013868 | A1 | 1/2002 | West |
| 2002/0044553 | A1 | 4/2002 | Chakravorty |
| 2002/0053011 | A1 | 5/2002 | Aiken et al. |
| 2002/0065867 | A1 | 5/2002 | Chauvel |
| 2002/0169938 | A1 | 11/2002 | Scott et al. |
| 2002/0195177 | A1 | 12/2002 | Hinkley et al. |
| 2003/0014607 | A1 | 1/2003 | Slavin et al. |
| 2003/0061395 | A1 | 3/2003 | Kingsbury et al. |
| 2003/0120935 | A1 | 6/2003 | Teal et al. |
| 2003/0200413 | A1 | 10/2003 | Gurumoorthy et al. |
| 2004/0010473 | A1 | 1/2004 | Hsu et al. |
| 2004/0010545 | A1 | 1/2004 | Pandya |
| 2004/0044929 | A1 | 3/2004 | Chujo |
| 2004/0105384 | A1 | 6/2004 | Gallezot et al. |
| 2004/0128568 | A1 | 7/2004 | O'Shea |
| 2004/0179546 | A1 | 9/2004 | McDaniel et al. |
| 2004/0201749 | A1 | 10/2004 | Malloy Desormeaux |
| 2004/0221056 | A1 | 11/2004 | Kobayashi |
| 2004/0228365 | A1 | 11/2004 | Kobayashi |
| 2005/0055406 | A1 | 3/2005 | Singhai et al. |
| 2005/0068897 | A1 | 3/2005 | Arita et al. |
| 2005/0076196 | A1 | 4/2005 | Zimmer et al. |
| 2005/0076244 | A1 | 4/2005 | Watanabe |
| 2005/0108385 | A1 | 5/2005 | Wechter et al. |
| 2005/0114620 | A1 | 5/2005 | Justen |
| 2005/0117601 | A1 | 6/2005 | Anderson et al. |
| 2005/0138628 | A1 | 6/2005 | Bradford et al. |
| 2005/0140683 | A1 | 6/2005 | Collins et al. |
| 2005/0149711 | A1 | 7/2005 | Zimmer et al. |
| 2005/0157781 | A1 | 7/2005 | Ho et al. |
| 2005/0198777 | A1 | 9/2005 | Mabe |
| 2005/0278498 | A1 | 12/2005 | Ahluwalia et al. |
| 2005/0285862 | A1 | 12/2005 | Noda et al. |
| 2006/0039285 | A1 | 2/2006 | Chapman et al. |
| 2006/0047989 | A1 | 3/2006 | Delgado et al. |
| 2006/0075119 | A1 | 4/2006 | Hussain et al. |
| 2006/0107071 | A1 | 5/2006 | Girish et al. |
| 2006/0136570 | A1 | 6/2006 | Pandya |
| 2006/0186700 | A1 | 8/2006 | Browne et al. |
| 2006/0186706 | A1 | 8/2006 | Browne et al. |
| 2006/0215697 | A1 | 9/2006 | Olderdissen |
| 2006/0218301 | A1 | 9/2006 | O'Toole et al. |
| 2006/0232051 | A1 | 10/2006 | Morris et al. |
| 2006/0248542 | A1 | 11/2006 | Wang et al. |
| 2007/0005869 | A1 | 1/2007 | Balraj et al. |
| 2007/0008983 | A1 | 1/2007 | Van Doren et al. |

(56) References Cited

U.S. PATENT DOCUMENTS

| | | |
|---|---|---|
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0086480 A1 | 4/2007 | Elzur |
| 2007/0118831 A1 | 5/2007 | Kondo |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0255802 A1 | 11/2007 | Aloni et al. |
| 2007/0261307 A1 | 11/2007 | Alexander |
| 2007/0286246 A1 | 12/2007 | Kobayashi |
| 2008/0005794 A1 | 1/2008 | Inoue et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0127292 A1 | 5/2008 | Cooper et al. |
| 2008/0148291 A1 | 6/2008 | Huang et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0006920 A1 | 1/2009 | Munson et al. |
| 2009/0024924 A1 | 1/2009 | Kim |
| 2009/0092057 A1 | 4/2009 | Doctor et al. |
| 2009/0113141 A1 | 4/2009 | Bullman et al. |
| 2009/0138650 A1 | 5/2009 | Lin et al. |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0322531 A1 | 12/2009 | Estevez et al. |
| 2010/0005014 A1 | 1/2010 | Castle et al. |
| 2010/0017655 A1 | 1/2010 | Gooding et al. |
| 2010/0049876 A1 | 2/2010 | Pope et al. |
| 2010/0082859 A1 | 4/2010 | Hendry et al. |
| 2010/0098419 A1 | 4/2010 | Levy et al. |
| 2010/0118041 A1 | 5/2010 | Chen et al. |
| 2010/0329319 A1 | 12/2010 | Dai et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama |
| 2012/0203880 A1 | 8/2012 | Kluyt et al. |
| 2012/0224640 A1 | 9/2012 | Sole Rojals et al. |
| 2012/0229076 A1 | 9/2012 | Zhu et al. |
| 2012/0260017 A1 | 10/2012 | Mine et al. |
| 2013/0039278 A1 | 2/2013 | Bouazizi et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111014 A1 | 5/2013 | Lawrie et al. |
| 2013/0138840 A1 | 5/2013 | Kegel et al. |
| 2013/0162911 A1 | 6/2013 | Glen |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2013/0347131 A1 | 12/2013 | Mooring et al. |
| 2014/0033220 A1 | 1/2014 | Campbell et al. |
| 2014/0068624 A1 | 3/2014 | Fuller et al. |
| 2014/0068636 A1 | 3/2014 | Dupont et al. |
| 2014/0122695 A1 | 5/2014 | Kulikov et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang |
| 2014/0247983 A1 | 9/2014 | MacInnis et al. |
| 2014/0355606 A1 | 12/2014 | Riddoch et al. |
| 2015/0007262 A1 | 1/2015 | Aissi et al. |
| 2015/0036051 A1 | 2/2015 | Broberg et al. |
| 2015/0081985 A1 | 3/2015 | Archer et al. |
| 2015/0156122 A1 | 6/2015 | Singh et al. |
| 2015/0172345 A1 | 6/2015 | Mantin et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0244804 A1 | 8/2015 | Warfield et al. |
| 2015/0261588 A1 | 9/2015 | Liu et al. |
| 2015/0309940 A1 | 10/2015 | Kumar |
| 2015/0326542 A1 | 11/2015 | Serebrin |
| 2015/0363110 A1 | 12/2015 | Batra et al. |
| 2015/0378737 A1 | 12/2015 | Debbage et al. |
| 2016/0028635 A1 | 1/2016 | Wang |
| 2016/0034195 A1 | 2/2016 | Li et al. |
| 2016/0041852 A1 | 2/2016 | Suarez Gracia et al. |
| 2016/0044143 A1 | 2/2016 | Narasimhamurthy |
| 2016/0063258 A1 | 3/2016 | Ackerly |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0208539 A1 | 7/2016 | Hofmann et al. |
| 2016/0224442 A1 | 8/2016 | Sanghi et al. |
| 2016/0226957 A1 | 8/2016 | Zhang et al. |
| 2016/0226967 A1 | 8/2016 | Zhang et al. |
| 2016/0231929 A1 | 8/2016 | Tsirkin |
| 2016/0261632 A1 | 9/2016 | Kölhi et al. |
| 2016/0269991 A1 | 9/2016 | Van Greunen et al. |
| 2016/0315880 A1* | 10/2016 | Guo ............ H04L 49/3009 |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1 | 12/2016 | Ho |
| 2017/0003977 A1 | 1/2017 | Sumida et al. |
| 2017/0003997 A1 | 1/2017 | Kelly et al. |
| 2017/0075856 A1 | 3/2017 | Suzue et al. |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |
| 2017/0371591 A1 | 12/2017 | Xia et al. |
| 2018/0004690 A1 | 1/2018 | Kaminski et al. |
| 2018/0070341 A1 | 3/2018 | Islam et al. |

(56) References Cited

U.S. PATENT DOCUMENTS

| | | |
|---|---|---|
| 2018/0081829 A1 | 3/2018 | Kaplan |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1 | 8/2018 | Petrbok et al. |
| 2018/0253315 A1 | 9/2018 | Norton et al. |
| 2018/0285561 A1 | 10/2018 | Frank et al. |
| 2018/0295052 A1 | 10/2018 | St. Laurent |
| 2018/0329743 A1 | 11/2018 | Pope et al. |
| 2018/0343206 A1 | 11/2018 | White et al. |
| 2018/0357176 A1 | 12/2018 | Wang |
| 2019/0036893 A1 | 1/2019 | Jiang |
| 2019/0052659 A1 | 2/2019 | Weingarten et al. |
| 2019/0065301 A1 | 2/2019 | Tsirkin et al. |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0140983 A1* | 5/2019 | Tu ................ H04L 63/0227 |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0019695 A1 | 1/2020 | Sovio et al. |
| 2020/0036615 A1 | 1/2020 | Lewis |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2020/0328966 A1* | 10/2020 | Wang ................ H04L 69/22 |
| 2021/0011856 A1 | 1/2021 | Xia et al. |
| 2021/0097006 A1 | 4/2021 | Masputra et al. |
| 2021/0099391 A1 | 4/2021 | Masputra et al. |

FOREIGN PATENT DOCUMENTS

| | | |
|---|---|---|
| JP | H03169996 A | 7/1991 |
| JP | 2013246642 A | 12/2013 |
| JP | 2015001867 A | 1/2015 |
| WO | WO 2008070138 A2 | 6/2008 |

OTHER PUBLICATIONS

Honda et al, "Rekindling Network Protocol Innovation with User-Level Stacks", ACM SIGCOMM Computer Communication Review, vol. 44, No. 2, Apr. 2014.

Gopalakrishnan R., et al., "Efficient User-Space Protocol Implementations with QoS Guarantees Using Real-Time Upcalls", IEEE/ACM Transactions on Networking, Aug. 1998, vol. 6 (4), pp. 374-388.

ECN L1 PM Substates with CLKREQ approved Aug. 23, 2012.

Jackson, "PCI Express Technology", Sep. 2012 (Sep. 2012), MindShare Press, xP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Whitworth, "Improving Networking by moving the network stack to userspace", Imperial College London, Jun. 14, 2010 [Mar. 17, 2022]; retrieved from the Internet: <URL https://www.doc.ic.ac.uk/teaching/distinguished-projects/2010/m.whitworth.pdf (Year: 2010).

* cited by examiner the the
METHODS AND APPARATUS FOR FLOW-BASED BATCHING AND PROCESSING

CROSS REFERENCE TO RELATED APPLICATIONS

This application claims priority to U.S. Provisional Patent Application No. 63/038,520, filed Jun. 12, 2020, which is incorporated by reference herein in its entirety.

This application is related to the subject matter of U.S. Provisional Patent Application Ser. No. 63/038,473 filed on Jun. 12, 2020 and entitled "Methods and Apparatus for Cross-Layer Transport Awareness," which is incorporated herein by reference in its entirety.

This following applications are incorporated by reference: U.S. patent application Ser. No. 16/144,992 filed Sep. 27, 2018, now pending, and entitled "Methods and Apparatus for Single Entity Buffer Pool Management", U.S. patent application Ser. No. 16/146,533 filed Sep. 28, 2018, now pending, and entitled "Methods and Apparatus for Regulating Networking Traffic in Bursty System Conditions", U.S. patent application Ser. No. 16/146,324 filed Sep. 28, 2018, now U.S. Pat. No. 10,978,224 and entitled "Methods and Apparatus for Preventing Packet Spoofing with User Space Communication Stacks", U.S. patent application Ser. No. 16/146,916 filed Sep. 28, 2018, now U.S. Pat. No. 10,819,831 and entitled "Methods and Apparatus for Channel Defunct Within User Space Stack Architectures", U.S. patent application Ser. No. 16/236,032 filed Dec. 28, 2018, now pending and entitled "Methods and Apparatus for Classification of Flow Metadata with User Space Communication Stacks", U.S. patent application Ser. No. 16/363,495 filed Mar. 25, 2019, now pending and entitled "Methods and Apparatus for Dynamic Packet Pool Configuration in Networking Stack Infrastructures", U.S. patent application Ser. No. 16/365,462 filed on Mar. 26, 2019, now pending and entitled "Methods and Apparatus for Sharing and Arbitration of Host Stack Information with User Space Communication Stacks", U.S. patent application Ser. No. 16/368,338, now pending, filed on Mar. 28, 2019 and entitled "Methods and Apparatus for Memory Allocation and Reallocation in Networking Stack Infrastructures", U.S. patent application Ser. No. 16/365,484, filed on Mar. 26, 2019, now pending and entitled "Methods and Apparatus for Virtualized Hardware Optimizations for User Space Networking", U.S. patent application Ser. No. 16/368,368 filed on Mar. 28, 2019, now pending, and entitled "Methods and Apparatus for Active Queue Management in User Space Networking", and U.S. patent application Ser. No. 16/368,214 filed on Mar. 28, 2019, now pending and entitled "Methods and Apparatus for Self-Tuning Operation with User Space Stack Architectures", U.S. Provisional Patent Application Ser. No. 62/906,617 filed Sep. 26, 2019 and entitled "Methods and Apparatus for Low Latency Operation in User Space Networking", U.S. Provisional Patent Application Ser. No. 62/906,645 filed Sep. 26, 2019 and entitled "Methods and Apparatus for Emerging Use Case Support in User Space Networking", and U.S. Provisional Patent Application Ser. No. 62/906,657 filed Sep. 26, 2019 and entitled "Methods and Apparatus for Device Driver Operation in Non-Kernel Space", the contents of the foregoing being incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronic devices, as well as networks thereof. More particularly, the disclosure is directed to methods and apparatus for implementing computerized networking stack infrastructures.

DESCRIPTION OF RELATED TECHNOLOGY

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations and provides an "abstracted" communication interface to the next layer. In this manner, different applications can communicate freely across different devices without considering the underlying network transport.

Kernel space processing overhead is a function of packet volume within existing communication stacks. Specifically, each layer of the communication stack processes packets one-at-a-time, with little to no shared knowledge between layers. Unfortunately, modern user applications consume a tremendous number of data packets, and the trend in consumer data usage will only continue to increase. Furthermore, processing and memory speeds appear to be asymptotically approaching the theoretical limitations of existing semiconductor manufacturing. Thus, the confluence of these factors (increasing overhead, aggressive consumer expectations, and diminishing improvements in semiconductor manufacturing) present significant design challenges for consumer electronics.

SUMMARY

The present disclosure satisfies the foregoing needs by providing, inter alia, methods and apparatus for flow-based batching and processing.

In one aspect, methods and apparatus for providing in-kernel flow control based on flow-batched data structures are disclosed. A method for managing a user space protocol stack can comprise receiving, by a nexus in a kernel space, a packet from a packet pool, wherein the packet is associated with one or more flows, wherein the one or more flows are individually identified by corresponding one or more flow keys; extracting information from the packet to generate a flow key of the packet indicating a particular flow for the packet; looking up the flow key in a flow table to determine whether there is an existing flow key stored in the flow table matching the flow key of the packet; storing, responsive to the existing flow key matching the flow key of the packet, the packet into a batch of packets of the existing flow, wherein the batch of packets of the existing flow are stored in a flow-batched data structure; and releasing, responsive to a release condition being met, the batch of packets of the existing flow to a user space protocol stack within a user space application through a channel communicatively coupled to the nexus and the user space protocol stack In one aspect, a non-transitory computer readable storage apparatus implementing one or more of the aspects disclosed herein is disclosed and described. A non-transitory computer readable medium comprising computer programs stored thereon, when executed by a processor, can cause a computerized apparatus to receive, by a nexus in a kernel space, a packet from a packet pool, wherein the packet is associated with one or more flows, wherein the one or more flows are individually identified by corresponding one or more flow keys; extract information from the packet to generate a flow key of the packet indicating a particular flow for the packet; look up the flow key in a flow table to determine whether there is an existing flow key stored in the flow table matching the flow key of the packet; store, responsive to the existing flow key matching the flow key of the packet, the packet into a batch of packets of the existing flow, wherein the batch of packets of the existing flow are stored in a flow-batched data structure; and release, responsive to a release condition being met, the batch of packets of the existing flow to a user space protocol stack within a user space application through a channel communicatively coupled to the nexus and the user space protocol stack.

In one aspect, methods and apparatus for providing in-kernel flow control based on flow-batched data structures are disclosed. A system configured for managing packet flows, can include a storage device to store a flow table; and a processor coupled to the storage device, and configured to operate a nexus in a kernel. The nexus is configured to receive a packet from a packet pool, wherein the packet is associated with one or more flows, wherein the one or more flows are individually identified by corresponding one or more flow keys; extract information from the packet to generate a flow key of the packet indicating a particular flow for the packet; look up the flow key in the flow table in the storage to determine whether there is an existing flow key stored in the flow table matching the flow key of the packet; store, responsive to the existing flow key matching the flow key of the packet, the packet into a batch of packets of the existing flow, wherein the batch of packets of the existing flow are stored in a flow-batched data structure; and release, responsive to a release condition being met, the batch of packets of the existing flow to a user space protocol stack within a user space application through a channel communicatively coupled to the nexus and the user space protocol stack.

In one aspect, methods and apparatus for representing multiple packet data structures according to natural memory boundaries of an operating system are disclosed.

In another aspect, computerized apparatus implementing one or more of the foregoing methods and/or apparatus are disclosed. In one embodiment, the computerized apparatus comprises a personal computer, such as a desktop computer.

In another aspect, the computerized apparatus comprises a mobile device such as a smartphone or tablet computer, or laptop computer.

In yet another aspect, the computerized apparatus comprises a server or server blade.

In still another aspect, the computerized apparatus comprises a GPU-based architecture optimized for deep learning or machine-learning.

In still another aspect, the computerized apparatus comprises a media player or rendering device, such as a portable player.

In still another aspect, the computerized apparatus comprises a host server or similar device, with hypervisor and configured to support multiple "guest" virtual machines (VMs) and/or containerized applications.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In a further embodiment, the IC device is a modem or modem chipset. In another embodiment, the IC device comprises a multi-core processor architecture.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device. As another embodiment, the storage device is part of a server "farm" or "big data" compute environment.

In yet another aspect, an operating system (OS) is disclosed. In one embodiment, the OS includes a user space and kernel space. In another embodiment, the OS is open-source (e.g., Linux)-based. In another embodiment, the OS is non-open (e.g., proprietary) based.

Other features and advantages of the present disclosure will immediately be recognized by persons of ordinary skill in the art with reference to the attached drawings and detailed description of exemplary embodiments as given below.

All figures ©Copyright 2017-2021 Apple Inc. All rights reserved.

DETAILED DESCRIPTION

Reference is now made to the drawings, wherein like numerals refer to like parts throughout.

DETAILED DESCRIPTION OF EXEMPLARY EMBODIMENTS

Existing Network Socket Technologies

Figure 1:
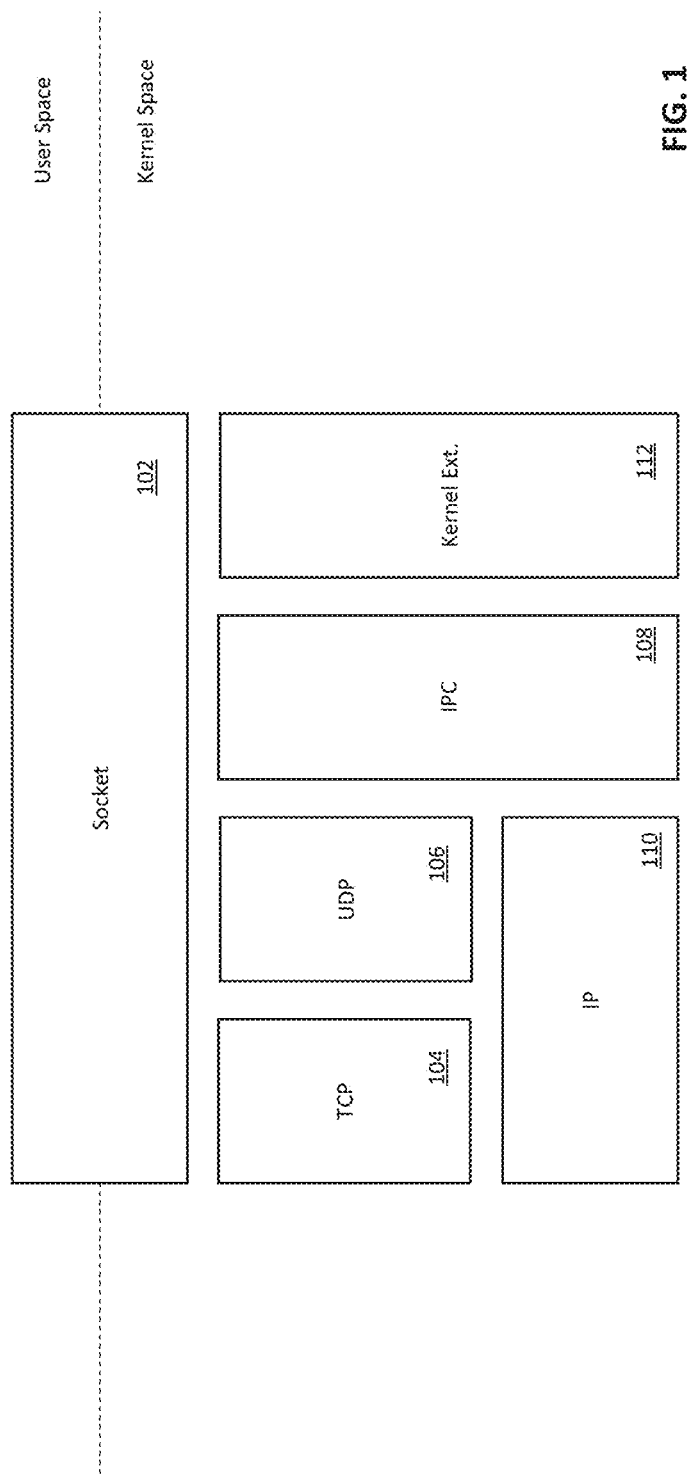
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox") and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the $3^{rd}$ party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Exiting Performance Optimization Technologies

Figure 2:
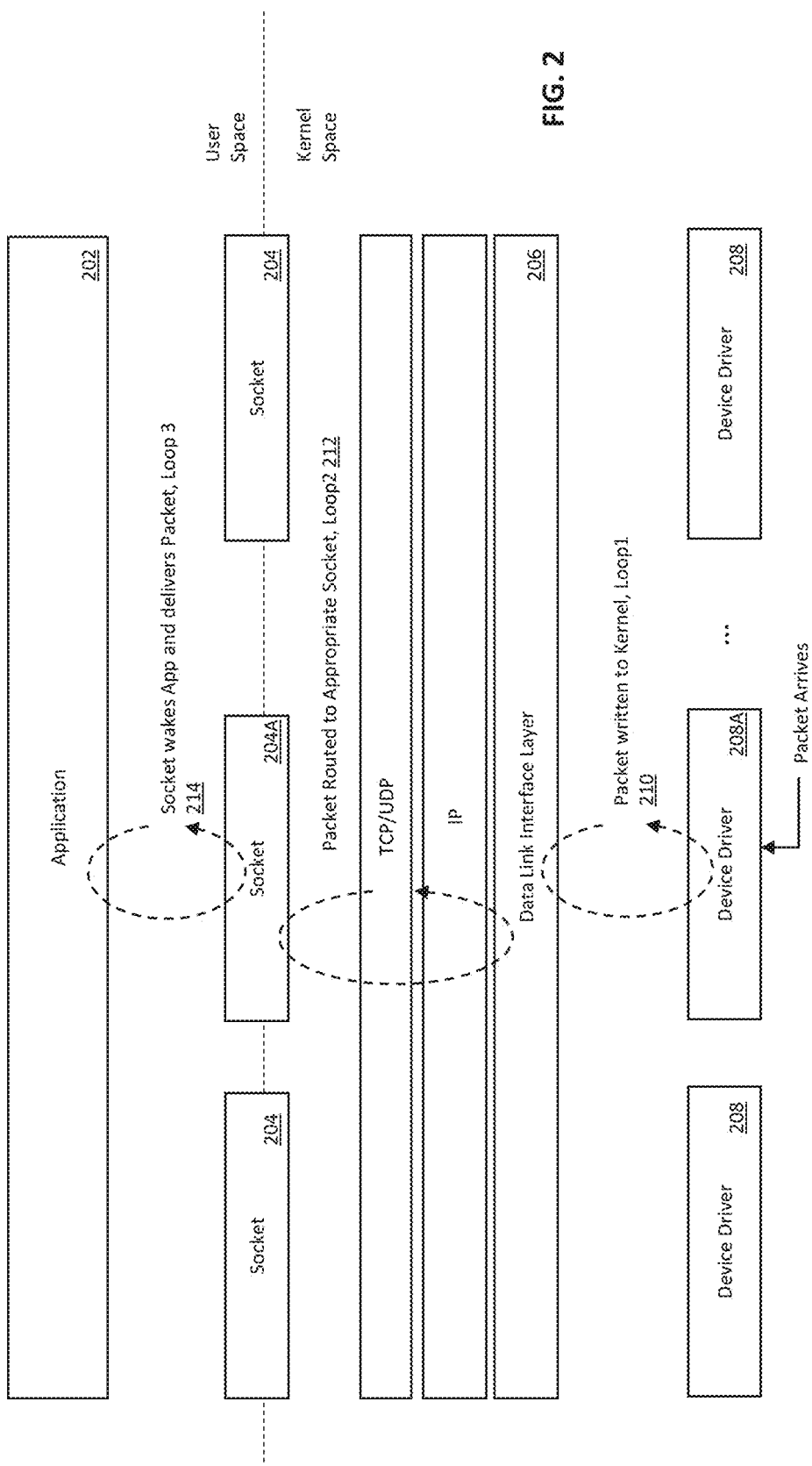
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
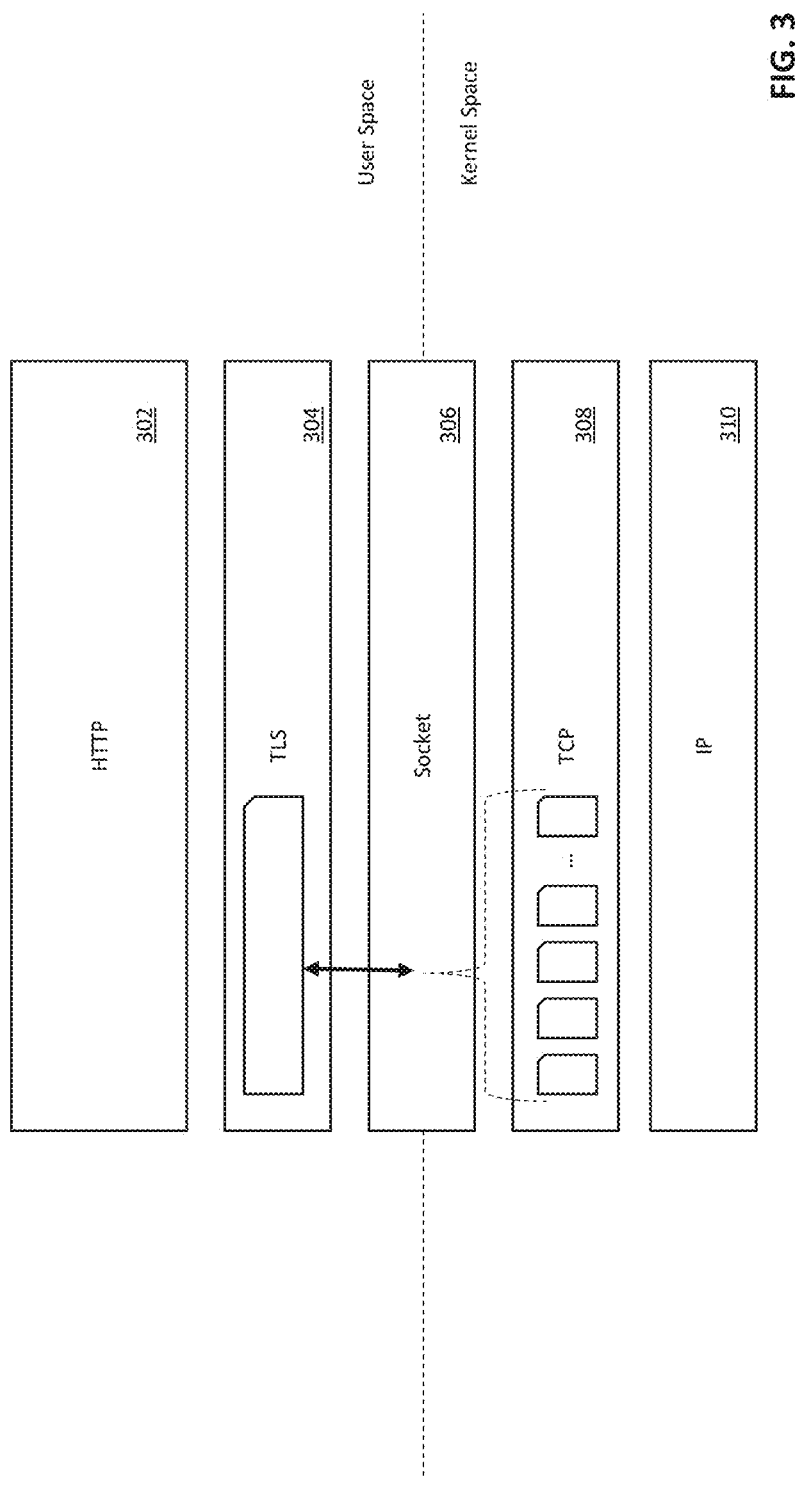
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
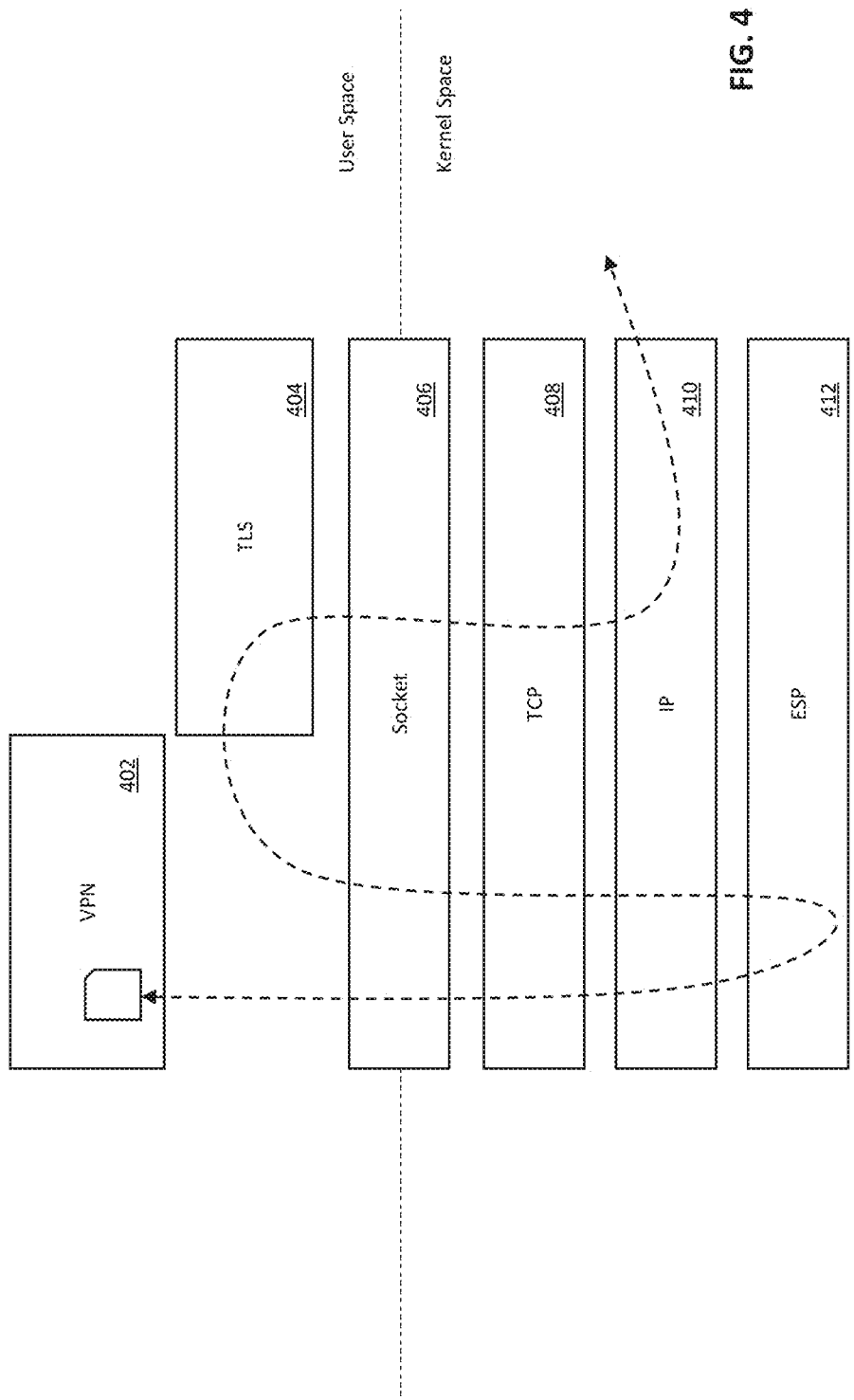
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
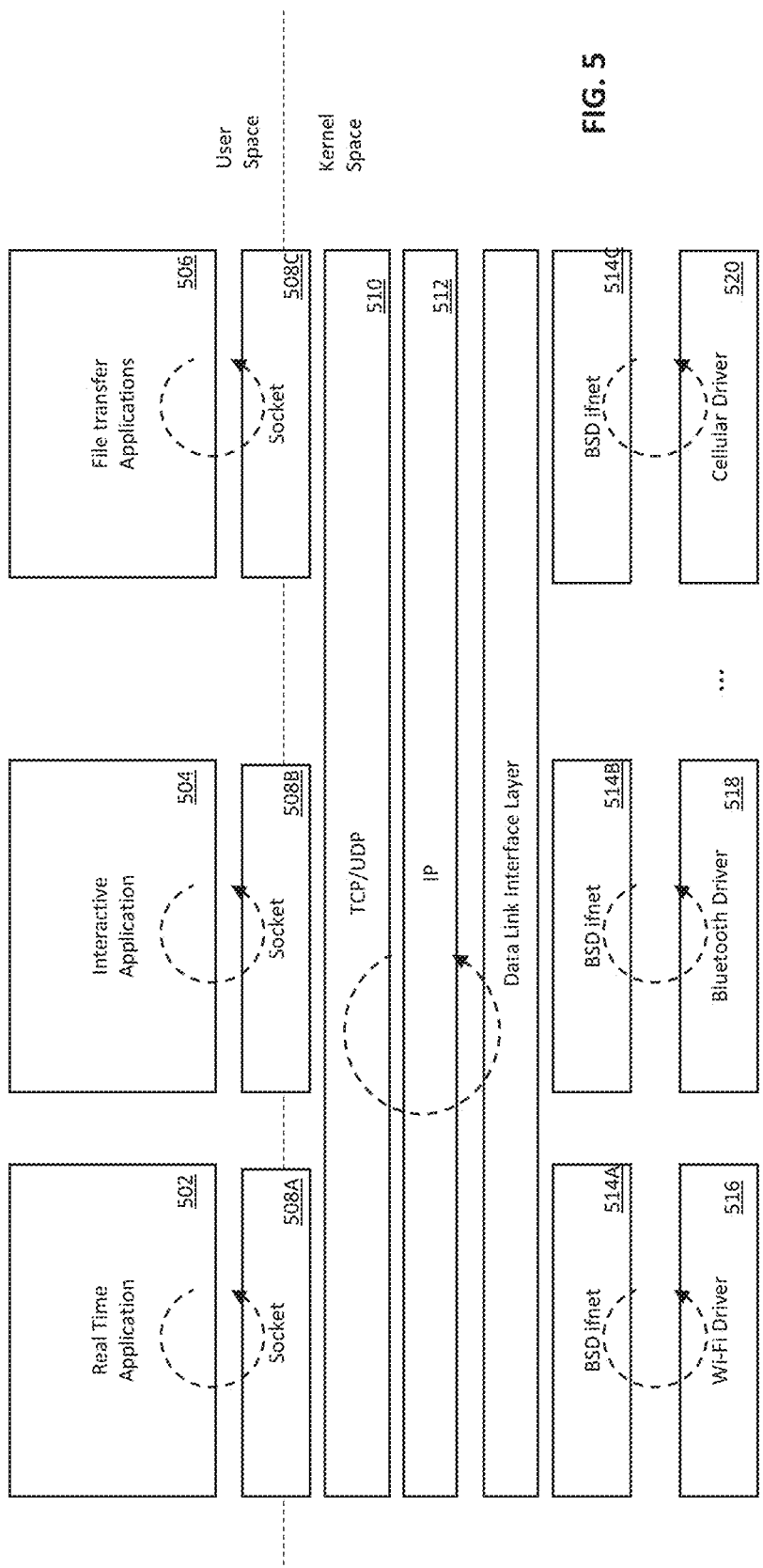
FIG. 5 illustrates a logical block diagram of an exemplary implementation of application-based tuning, useful to explain various other workload optimization complexities of emerging use cases.

FIG. 5 illustrates a logical block diagram of an exemplary implementation of application-based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention-based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mice). Cellular network technologies 520 often provide non-contention-based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary User Space Networking Architecture

A networking stack architecture and technology that caters to the needs of non-kernel-based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

The user space networking stack architecture provides an efficient infrastructure to transfer data across domains (user space, non-kernel, and kernel). Unlike the traditional networking paradigm that hides the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket-based communication. Additionally, direct transfer can improve observability and accountability with traffic monitoring.

Figure 6:
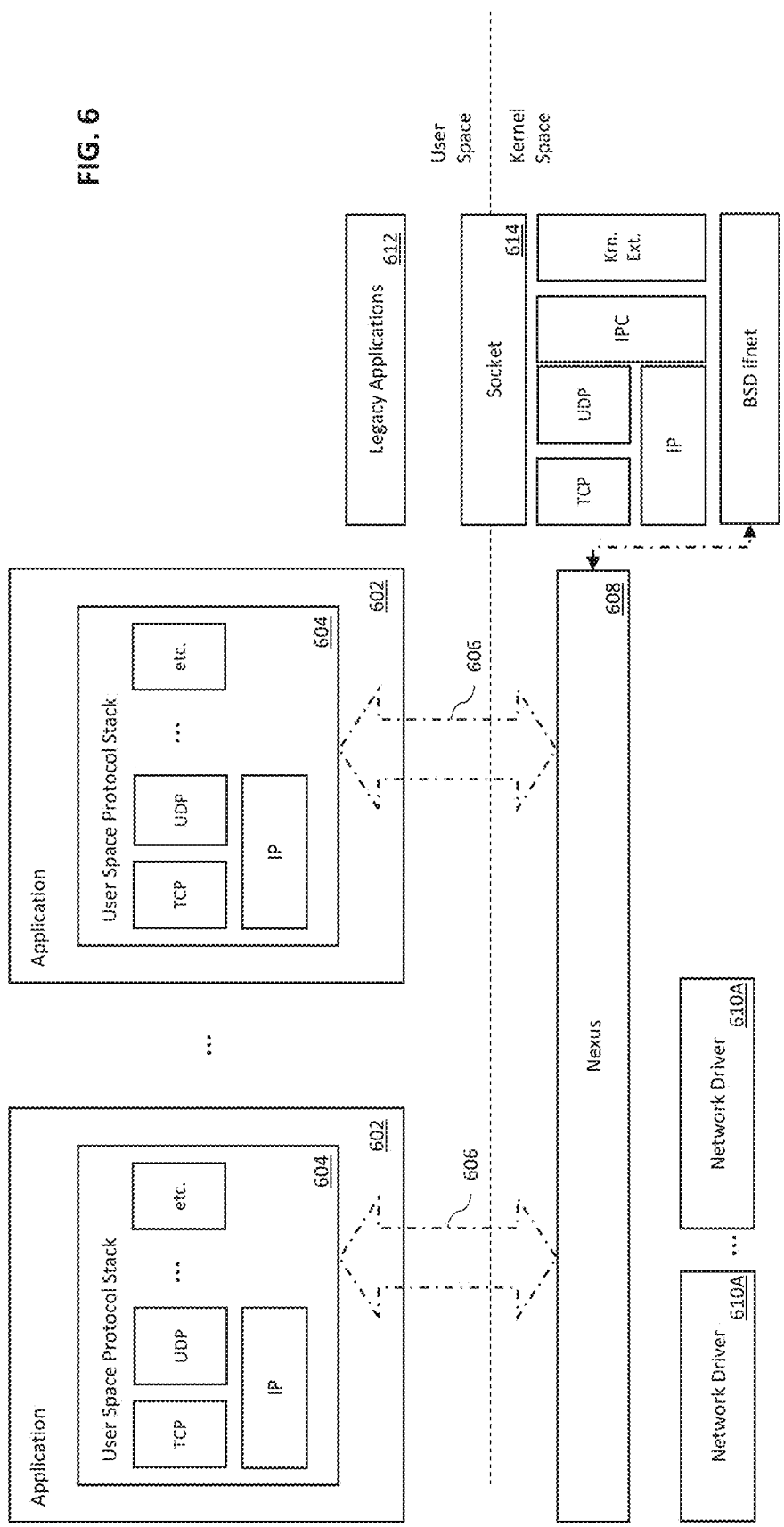
FIG. 6 illustrates one logical representation of an exemplary user space networking stack architecture, in accordance with the various aspects of the present disclosure.

FIG. 6 illustrates one logical representation of an exemplary user space networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally, shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary User Space I/O Infrastructure

In one embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor-based object, rather than as data. In order to access the data, the process de-references the file descriptor for direct access to the shared memory within kernel space. In one such implementation, the file descriptor-based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security-based information (e.g., cyclic redundancy checks (CRC), parity, etc.).

In one embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

In one embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology-based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus

In one embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one embodiment, the nexus 608 may additionally ensure that there is fairness and/or appropriately prioritize each of its connected stacks. For example, within the context of FIG. 6, the nexus 608 balances the network priorities of both the existing user space application networking stacks 604, as well as providing fair access for legacy socket-based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket-based access. For example, user application networking space may be more heavily weighted to improve overall performance or functionality, whereas legacy socket-based access may be preferred where legacy applications are preferentially supported.

Exemplary Network Extensions

In one embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

Exemplary User Space Networking Stack

Figure 7:
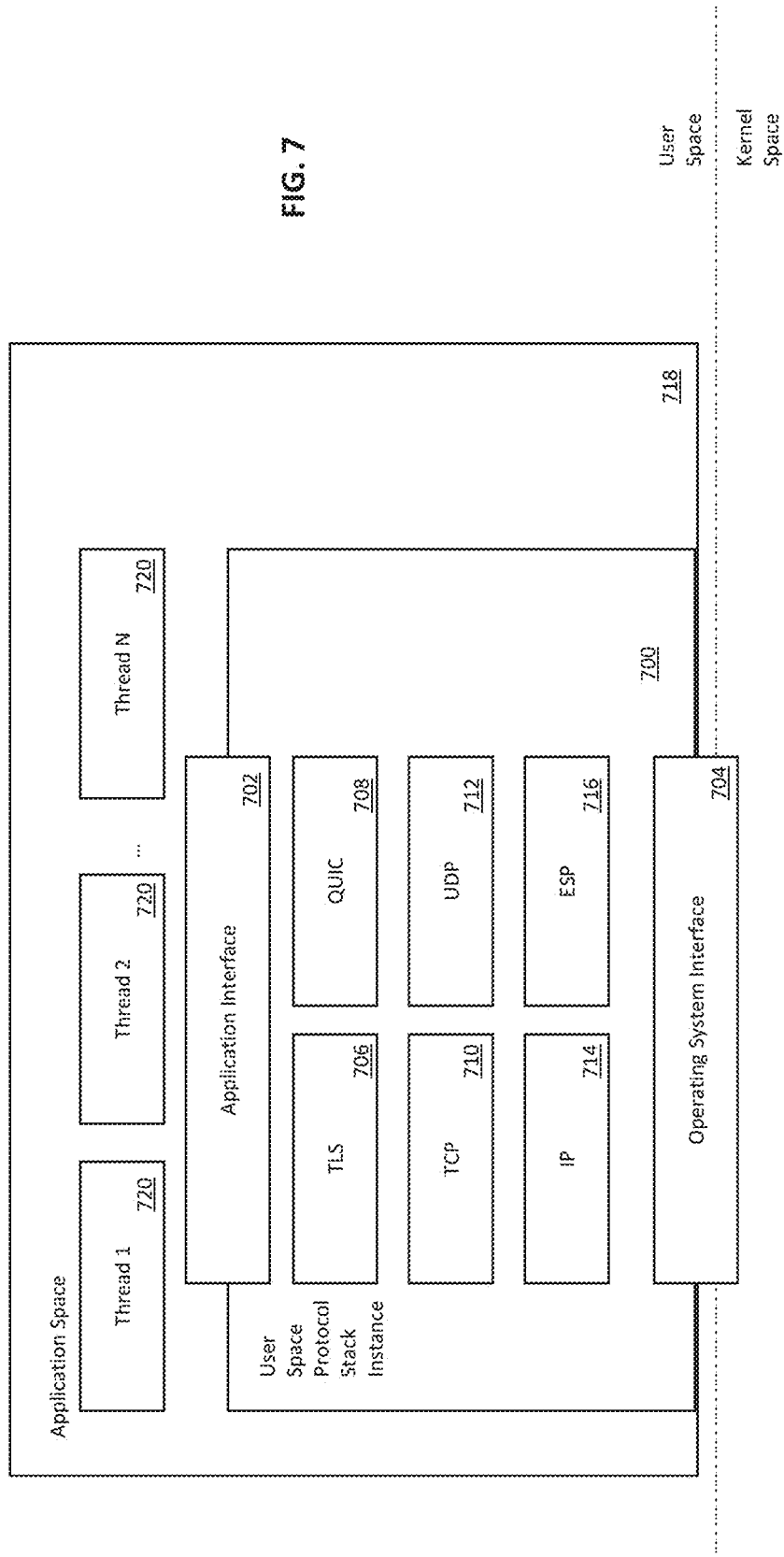
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space network stack operation is cross platform compatibility. For example, certain types of applications (e.g., iTunes®, Apple Music®) developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., Face Time®) developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Packet-Based Processing and Port-Batching

Figure 8:
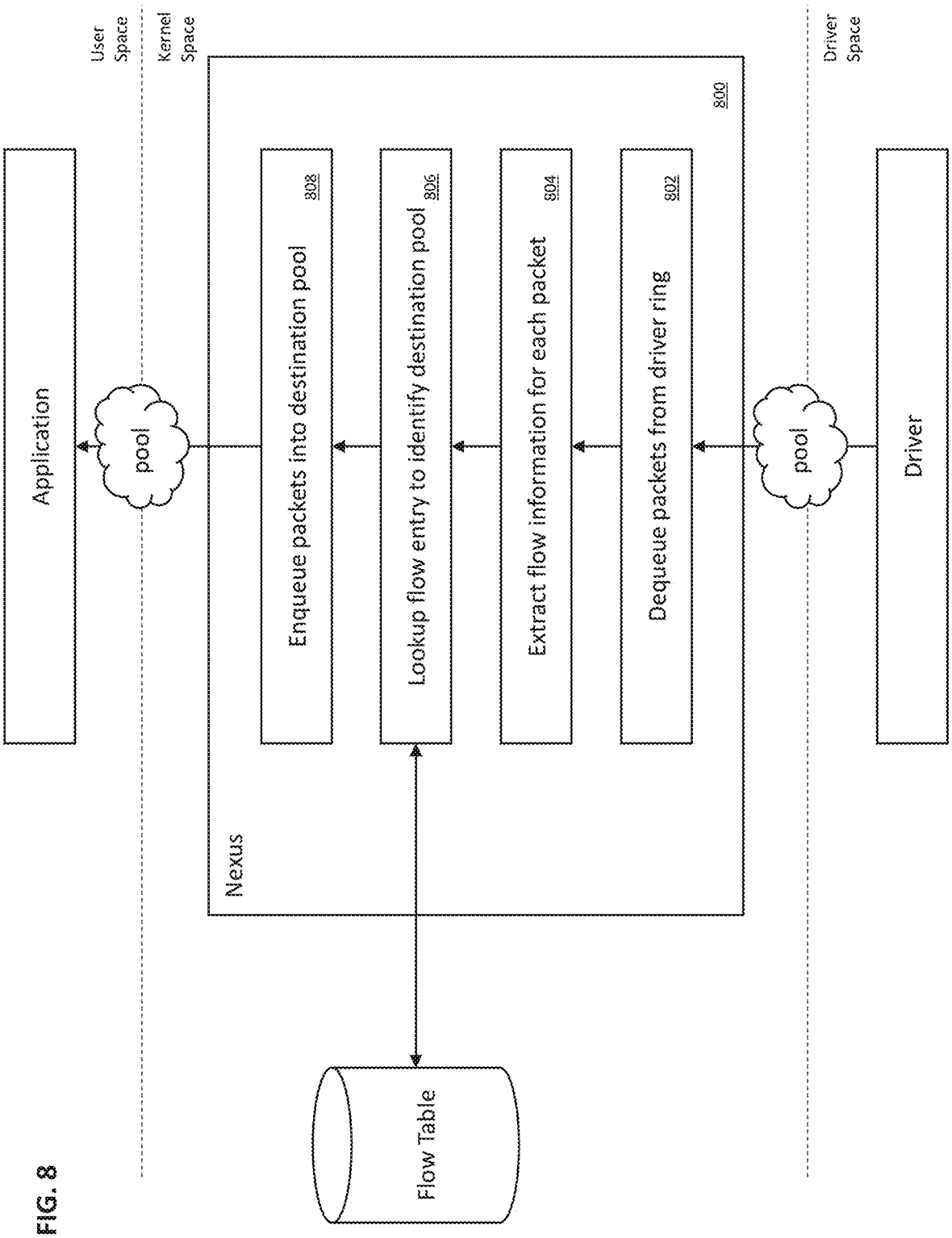
FIG. 8 is a logical flow diagram of packet-based processing operations within a nexus, useful to illustrate various aspects of the present disclosure.

FIG. 8 is a logical flow diagram of packet-based processing operations within a nexus, useful to illustrate various aspects of the present disclosure. While the following discussion is presented in the context of packet reception, analogous behavior is present in packet transmission.

As shown in the illustrated example, the nexus 800 dequeues received packets from the driver packet pool ring (step 802). For each packet, the nexus inspects the packet header to extract flow information (step 804). At step 806, the flow information is used to lookup a destination packet pool from a flow table. Thereafter the packet is enqueued to its corresponding destination packet pool (step 808). After all the packets have been processed, the nexus can notify destination user space applications of packet delivery. Thereafter, the user space applications may receive their pool of packets. The aforementioned packet-based processing is a substantial improvement over traditional BSD techniques because packets are routed without substantial protocol processing (e.g., the higher protocol layers (TCP, IP, etc.) are handled as needed by the user space application.)

Figure 9:
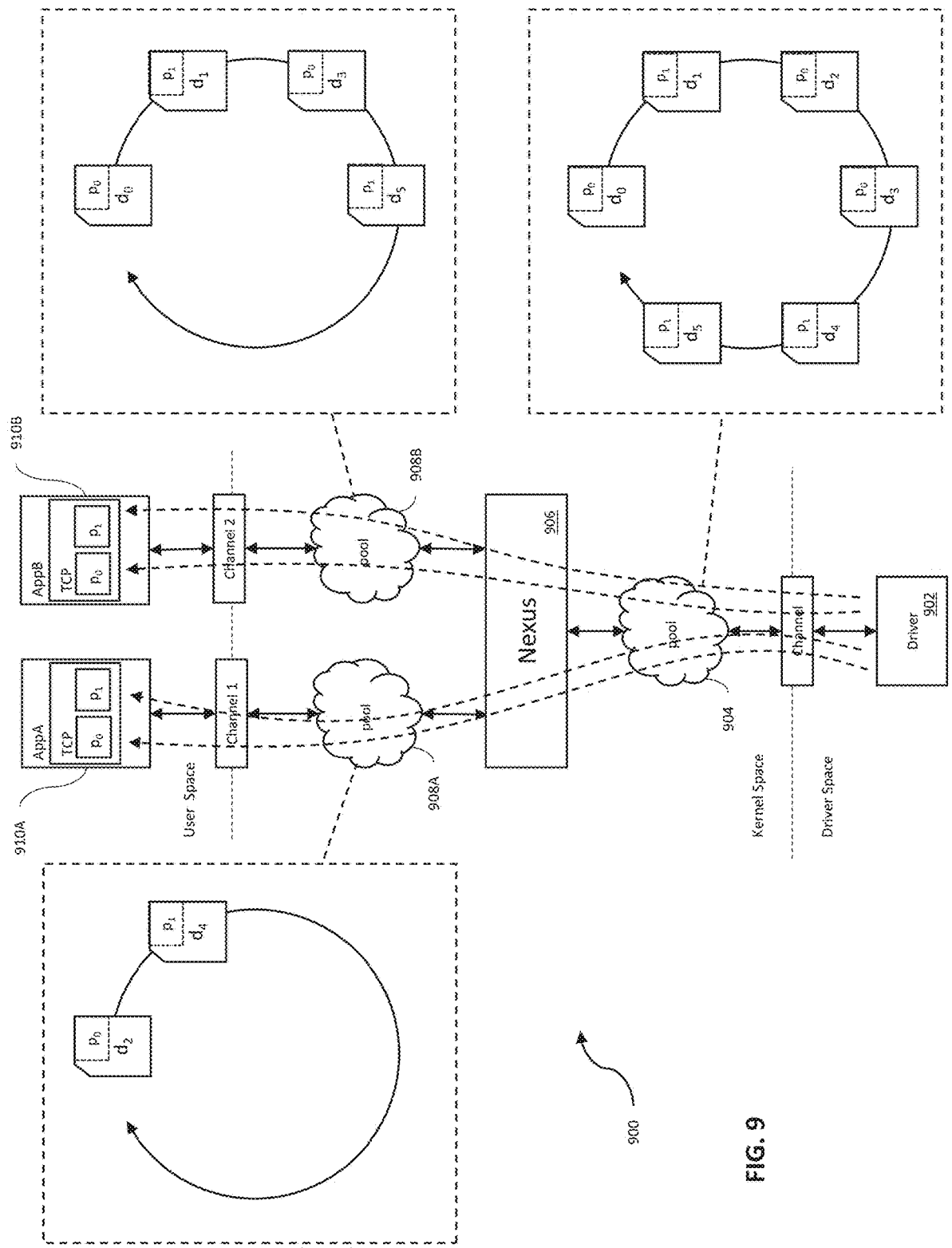
FIG. 9 is a logical block diagram of packet-based routing within a user space networking stack architecture, useful to illustrate various aspects of the present disclosure.

FIG. 9 is a logical block diagram of packet-based routing within a user space networking stack architecture, useful to illustrate various aspects of the present disclosure. In FIG. 9, a network interface card (NIC) driver 902 receives packets via ongoing network communications. Packets are locally buffered within the NIC's packet pool 904 until they are ready for release. Notably, the NIC driver 902 does not have visibility into higher layers of the protocol stack (e.g., source and destination addresses), thus packets are typically stored as they are received. The kernel space nexus 906 dequeues each packet from the driver packet pool 904 and processes packets one at a time; thereafter the packets are enqueued into their associated user space pool 908A, 908B. The user space applications 910A, 910B can retrieve their corresponding packet pools on an as-needed basis.

Figure 10:
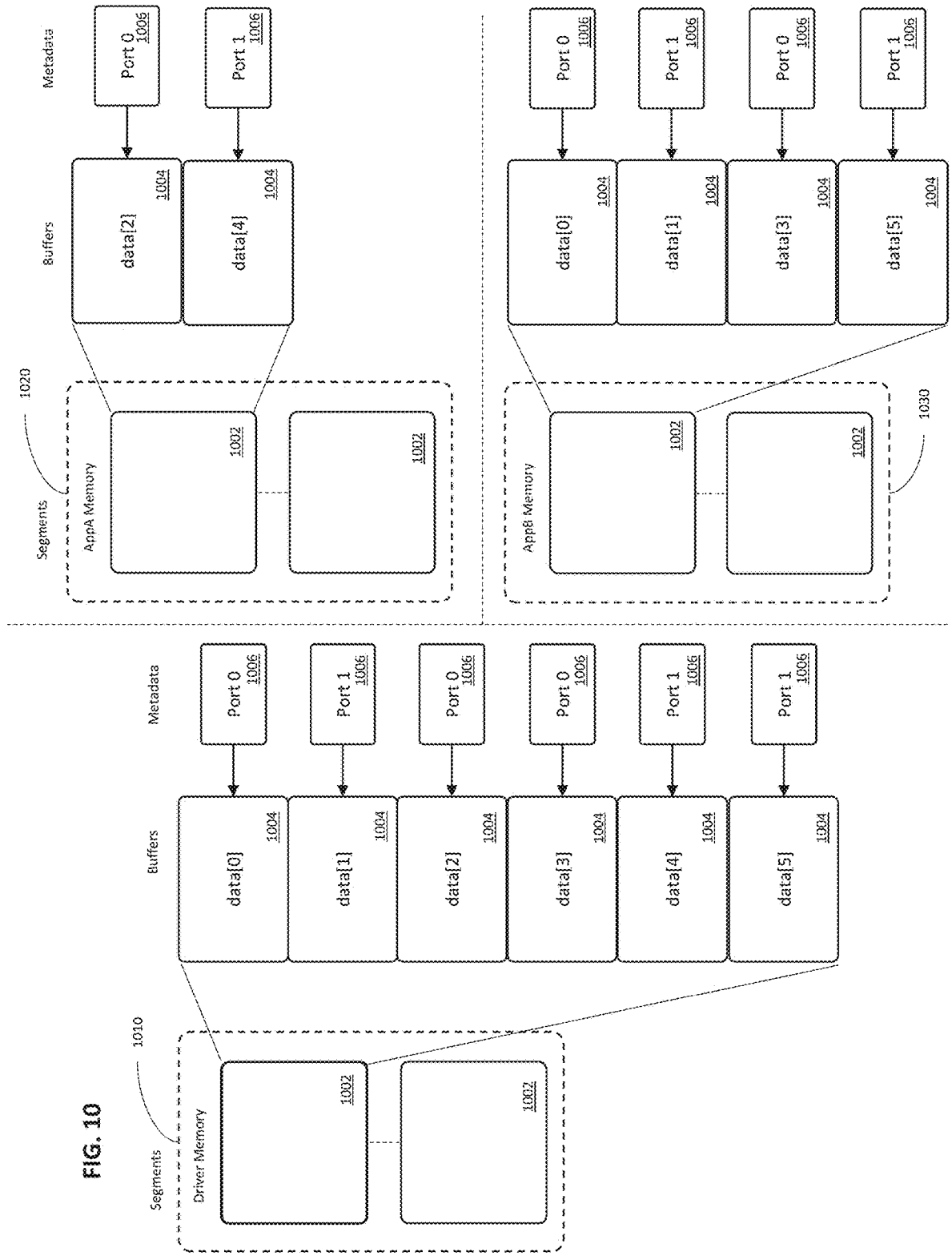
FIG. 10 is a graphical representation of memory allocations for packet data structures, useful to explain various aspects of the present disclosure.

FIG. 10 is a graphical representation of memory allocations for packet data structures, useful to explain various aspects of the present disclosure. As shown in FIG. 10, packet pool memory allocations are split into a number of segments 1002 (e.g., 32 KB), each segment is composed of buffers 1004 (e.g., 2 KB) which hold packets and corresponding metadata 1006 (where available). The aforementioned batched packet-based routing copies packets from the driver packet pool 1010 to corresponding packet pools (1020, 1030); this entails distinct read and write (read-write) accesses for each buffer 1004 and its corresponding metadata 1006.

As an important observation, the driver writes data packets into the buffers of its packet pool according to its own operational considerations (which may be out-of-sequence); the driver relies on higher layers of the network stack (e.g., the TCP/IP layers) to rearrange packets into their correct sequence. Notably, traditional network devices use a single IP address for all network connections because all user space applications are serviced by a single monolithic network stack. Packet data is written to the aforementioned sockets for delivery to endpoint applications. Certain "smart" NIC drivers may additionally tag data packets with metadata that is useful for packet-based processing. As but one such example, so-called Large Receive Offload (LRO) and/or Large Send Offload (LSO) capable NICs may provide source and/or destination port information in packet metadata. By convention, certain network ports require special handling; thus, LRO and LSO may also batch packet data according to ports. So-called "port-batching" is used within high-end network routers and switches to prioritize/deprioritize port specific tasks (e.g., HTTP connection establishment via port 80, etc.)

Within the context of user space networking architectures, hardware acceleration (e.g., port-batching) is often suboptimal because it assumes the presence of a monolithic kernel space network stack. For example, since the aforementioned user space networking architecture supports a distinct user space network stack for each application, port identifiers alone are not sufficient to identify the destination port (concurrently running stacks may have conflicting usages of the same port identifiers.) Consequently, port-batching does not significantly improve packet-based routing and, in fact, incorrectly orders packets within user packet pools.

For example, each packet is sequentially dequeued from the driver pool and then enqueued into its corresponding user space packet pools by the nexus (kernel space). However, port-batching packets at the driver pool results in out-of-sequence delivery to user space packet pools. As a result, user applications must also parse each packet again to arrange the packets into their correct sequence. Furthermore, priority handling associated with port-batching may inadvertently cause the early or late delivery of collateral packets. For example, a prioritized port packet that must be immediately delivered to a user space application will also cause the early delivery of all of the packets within the application's pool (even though the pool may have incomplete packet flows). In other words, the port-batched packet-based routing mechanism causes inefficient downstream processing.

Even though the aforementioned user space networking architecture substantially improves over traditional networking architectures, packet routing continues to be a limiting factor in overall device performance.

Flow-Batching and Flow-Based Processing

In one exemplary embodiment, the nexus classifies and batches packet flows into flow data structures ("flow-batching") for flow-based processing. Specifically, the nexus transfers flow-batched data structures (rather than individual packets) between its user and driver space applications. The nexus may additionally leverage user and/or driver space metadata to manage flow-batched data structures. Flow-batching enables in-kernel flow-based processing for packet flows. As a related benefit, flow-based processing improves instruction locality; e.g., hardware accelerators can create metadata to tag flows, the kernel can organize flows based on hardware metadata and kernel information, and applications can leverage flow information based on user space considerations. The exemplary processes described herein preserve information for downstream processing which may help reduce processing costs.

Figure 11A:
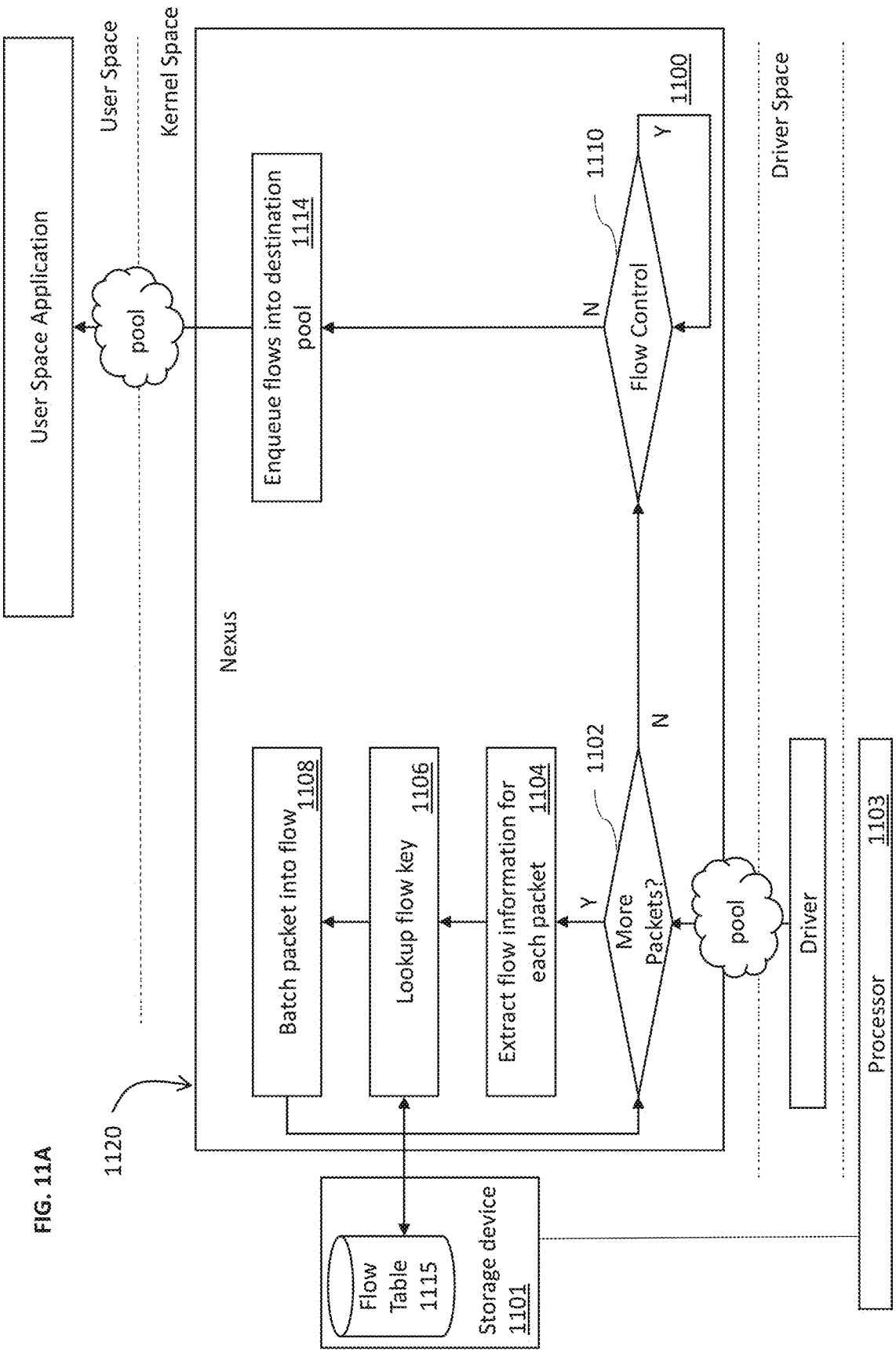
FIGS. 11A-11B are logical flow diagrams of flow-based processing within an exemplary nexus, in accordance with the various aspects described herein.

FIG. 11A is a logical block diagram of flow-based routing process 1120 within an exemplary nexus, in accordance with the various principles described herein. Initially, the nexus 1100, which can be implemented by processor 1103, dequeues packets from the driver pool. For each packet of the driver pool (step 1102), information is extracted to generate a "flow key" (step 1104). In one exemplary embodiment, the flow key may include protocol information (e.g., IP version information, IP protocol, etc.) and source and destination information (e.g., source and destination IP addresses, and source and destination port identifiers). The nexus uses the flow key to lookup existing flows from a flow table 1115 stored in a storage device 1101 (step 1106). In some embodiments, storage device 1101 can be main memory or CPU cache. If a packet has the same flow key as an existing flow, then the packet is batched (e.g. stored) with the other packets of the flow (step 1108); if no matching flow key is found, then a new flow key entry is added to the flow table 1115. Notably, flow keys are unique to each network flow, and are differentiable between different user space networking stacks. Packets may still be received out-of-sequence due to delivery errors, etc. however batching packets into flows (flow-batching) prevents inadvertent intermingling of packet flows.

Additionally, as depicted in step 1102, a flow may not be released by the nexus until a release condition exists (e.g., all the packets have arrived, a port event specific to the flow has occurred, etc.) In other words, packet-based processing of a driver pool processes all the packets of the driver pool for delivery; in contrast, flow-based processing delivers flows according to flow-specific considerations.

In the illustrated embodiment, the nexus 1100 may additionally impose flow control on flows that are ready to be delivered. Generally, flow control refers to the process of managing data transfer rates between two nodes; e.g., to prevent a fast sender from overwhelming a slow recipient, or a slow sender from reserving too many resources of a fast recipient. For example, a completed flow may be held at step 1110 until more flows are ready for delivery. Other in-kernel flow control may be performed when necessary (e.g., prioritization, deprioritization, aggregation, status reporting, feedback, error detection, error recovery, retransmission, etc.) Thereafter, the flow data structures are enqueued for delivery to their corresponding pools (step 1114).

Figure 11B:
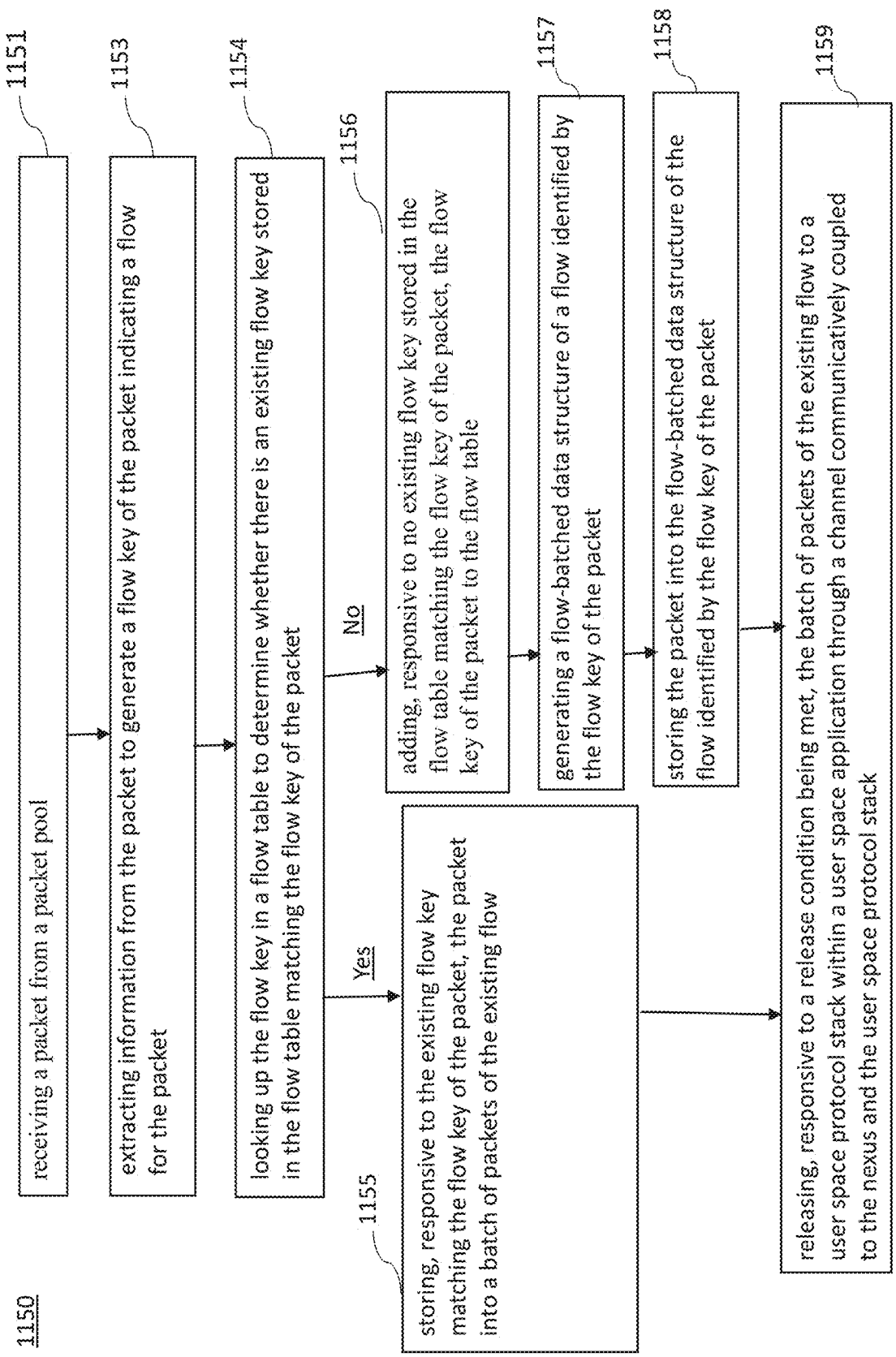

FIG. 11B is a flow diagram of a process 1150 for flow-based routing within an exemplary nexus, in accordance with the various principles described herein. Process 1150 can be performed by processor 1103 coupled to storage device 1101, where flow table 1115 is stored.

At 1151, processor 1103 receives a packet from a packet pool. The packet is associated with one or more flows, where the one or more flows are individually identified by corresponding one or more flow keys. At 1153, processor 1103 extracts information from the packet to generate a flow key of the packet indicating a flow for the packet. In aspects, flow keys are unique (e. g., individual) to each of the network flows. Hence, a first flow is identified by a first flow key, and a second flow is identified by a second flow key different from the first flow key. At 1154, processor 1103 looks up the flow key in flow table 1115 in storage device 1101 to determine whether there is an existing flow key stored in the flow table matching the flow key of the packet.

At 1155, responsive to the existing flow key matching the flow key of the packet, processor 1103 stores the packet into a batch of packets of the existing flow. The batch of packets of the existing flow are stored in a flow-batched data structure. At 1159, processor 1103 releases, responsive to a release condition being met, the batch of packets of the existing flow to a user space protocol stack within a user space application through a channel communicatively coupled to the nexus and the user space protocol stack.

In addition, at 1156, responsive to no existing flow key stored in the flow table 1115 matching the flow key of the packet, processor 1103 may add the flow key of the packet to flow table 1115. At 1157, processor 1103 may generate a flow-batched data structure of the particular flow identified by the flow key of the packet. At 1158, processor 1103 may store the packet into the flow-batched data structure of the particular flow identified by the flow key of the packet. Similarly, at 1159, processor 1103 can release, responsive to a release condition being met, the batch of packets of the existing flow to a user space protocol stack within a user space application through a channel communicatively coupled to the nexus and the user space protocol stack.

Figure 12:
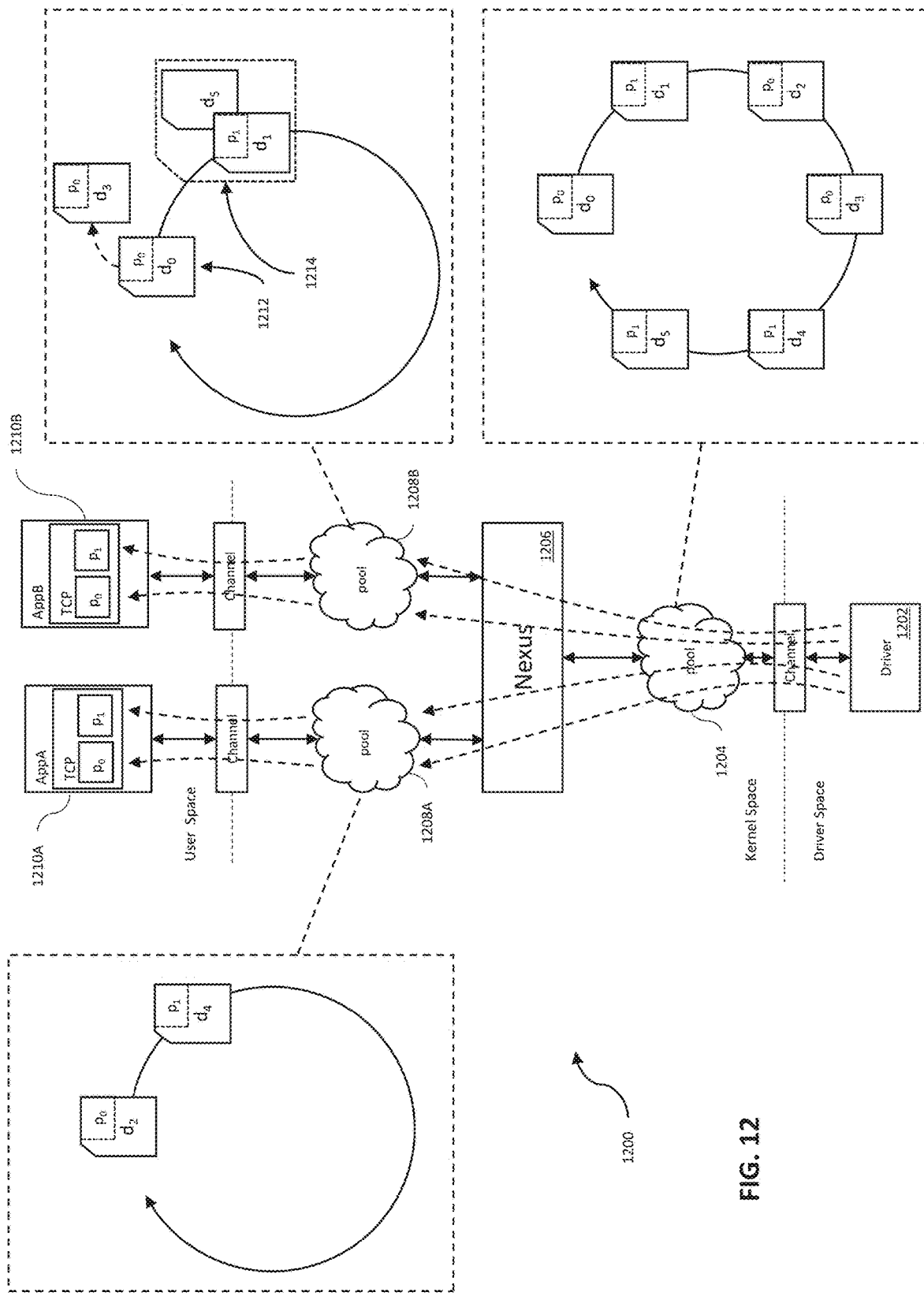
FIG. 12 is a logical block diagram of flow-based routing within an exemplary user space networking stack architecture, in accordance with the various principles described herein.

FIG. 12 is a logical flow diagram of flow-based processing within an exemplary nexus, in accordance with the various principles described herein. The network interface card (NIC) driver 1202 receives and buffers packets; e.g., packets are buffered in packet pool 1204 as they are received. In some embodiments, a smart NIC may inspect the packets and attach useful metadata (e.g., port information, etc.)

The exemplary kernel space nexus 1206 reads each packet from the driver packet pool 1204, and batches packet flows based on a flow key that is unique to the network connection (e.g., source and destination IP addresses, and source and destination port identifiers.) In one embodiment, the flow-batched data structures may further leverage metadata provided from e.g., applications, drivers, etc. For instance, the flow-batched data structures may use port metadata provided by LRO/LSO capable NIC hardware.

In one embodiment, flow-batched data structures may represent flows of packet data to facilitate downstream processing. For example, as shown in FIG. 12, four (4) packets of the driver packet pool ($d_0$, $d_1$, $d_3$, $d_5$) may be batched into a first flow-batched data structure 1212 (referred to as a "chain of packets") and a second flow-batched data structure 1214 (referred to as a "super packet"). In one exemplary embodiment, a "chain" of packets 1212 refers to a linked list of data packets that are specific to a flow. The chain may be routed and/or released together thereby facilitating flow-based routing. However, the chain of packets 1212 preserves each packet's individual metadata; packets may be added or removed from the chain. In other words, each packet of the chain of packets retains its autonomy (an individual packet may be corrupted and ACK'd, etc.) In contrast, the exemplary super packet 1214 merges packet metadata such that all packets share the same metadata; super packets 1214 reduce overall size and simplify handling, however a super packet 1214 must be handled in aggregate. Notably, super packets 1214 may be converted into chains of packets 1212 merely by duplicating redundant metadata and vice versa.

In one exemplary embodiment, once the nexus has batched packets from the driver pool into distinct flow-batched data structures, each flow may be separately held or released in the packet pools 1208A, 1208B without impacting other flows. For example, low-latency flows may be released as soon as packets arrive to ensure timely delivery; however, flows for bulk data transfers may be queued to maximize throughput. Additionally, the nexus can leverage driver metadata to organize and/or manage flows; thus, the valuable insights provided by hardware may be leveraged by the nexus (and preserved for downstream processing at user space applications as well).

Figure 13:
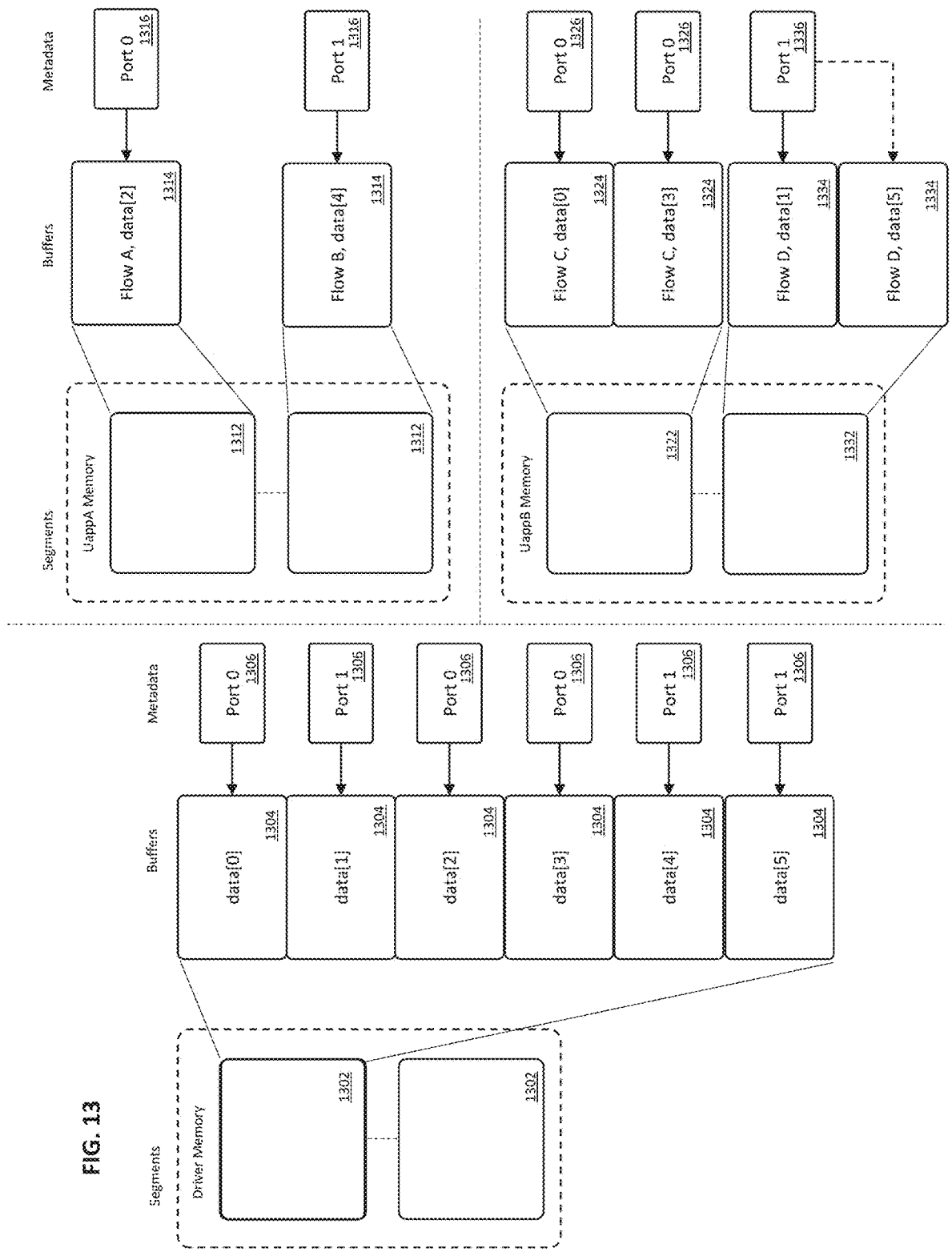
FIG. 13 is a graphical representation of memory allocations for exemplary packet, super packet, and chained packet data structures, in accordance with the various principles described herein.

FIG. 13 is a graphical representation of memory allocations for exemplary packet, super packet, and chained packet data structures, in accordance with the various principles described herein. As shown in FIG. 13, driver pool memory allocations may be divided in a similar manner to the packet pool memory allocations of FIG. 10; for example, each segment 1302 (e.g., 32 KB) is composed of buffers 1304 (e.g., 2 KB) which hold packets and corresponding metadata 1306. In contrast, flow-batched data structures may be stored so as to align with native memory boundaries of the operating system (segments, buffers, etc.) Natively aligned flow-batched data structures facilitate non-blocking flow access; in other words, access to the packets of one flow-batched data structure is not dependent on (and is not blocked by) other data structures.

For example, packets for flow A and flow B are aligned on separate segments 1312 and buffers 1314; each flow has different corresponding metadata 1316. Flow C is a chain of packets which aligns each constituent packet on buffer boundaries. For instance, the first packet is aligned to the first buffer 1324 of the segment 1322. The second packet is aligned with the second buffer 1324 of the segment 1322. Both packets have their own metadata 1326. Flow D is a super packet that compresses metadata to reduce data size; only the first packet aligns to segment boundaries 1332. Subsequent packets may or may not align to buffer boundaries 1334. Only one copy of metadata 1336 is kept (the second packet references a pointer to the first packet's metadata).

Figure 14:
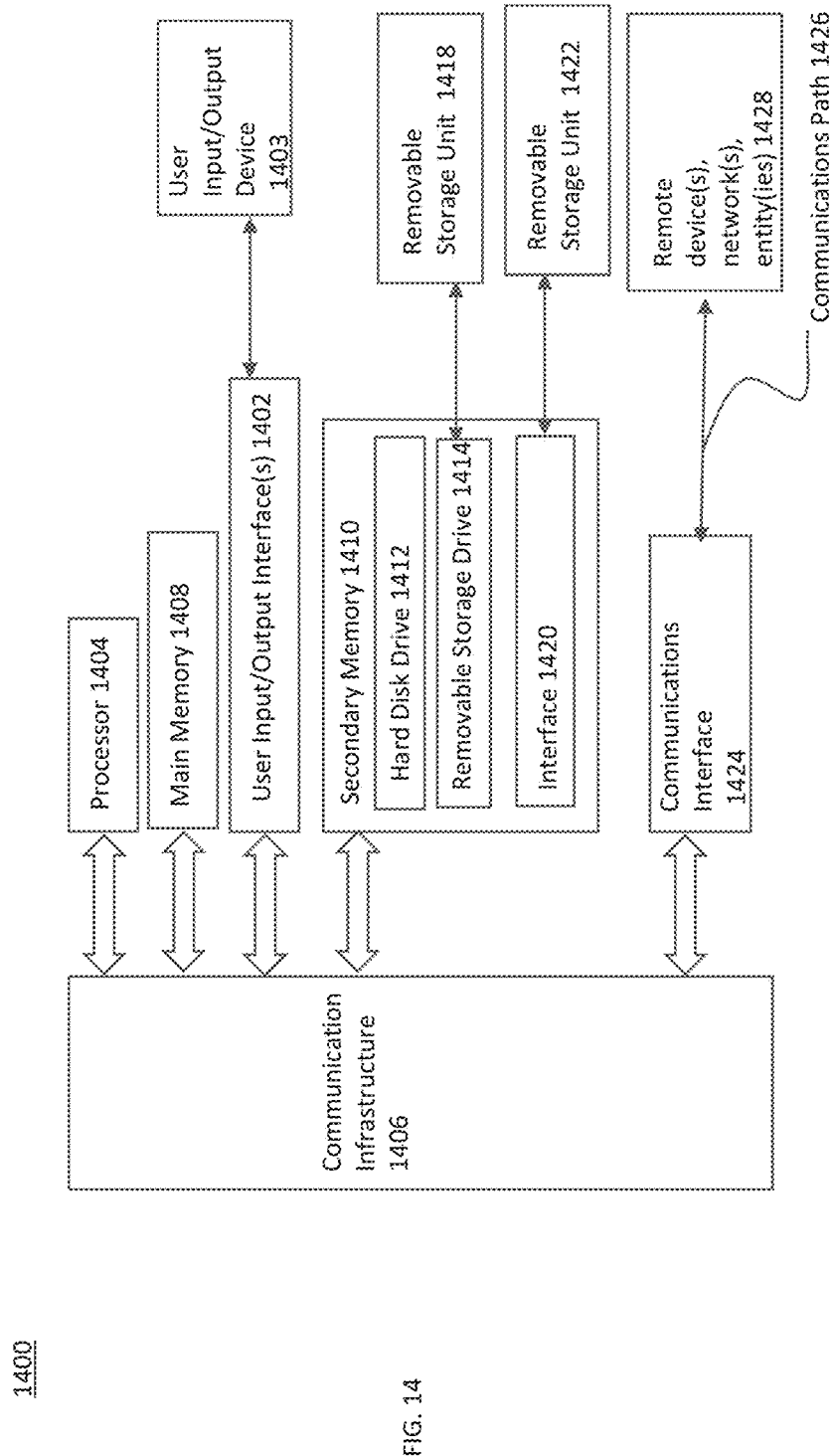
FIG. 14 is an example computer system useful for implementing various aspects described herein.

Various embodiments can be implemented, for example, using one or more computer systems, such as computer system 1400 shown in FIG. 14. Computer system 1400 can be used, for example, to implement processes of FIGS. 11A-11B. For example, computer system 1400 can implement and execute a set of instructions comprising operations for managing a user space networking stack, and flow-based processing and routing within a user space networking stack architecture as illustrated in FIGS. 1-13. Computer system 1400 can be any computer capable of performing the functions described herein.

Computer system 1400 includes one or more processors (also called central processing units, or CPUs), such as a processor 1404. Processor 1404 is connected to communication infrastructure or bus 1406.

One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure 1406 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

As used herein, the term "native" and "natural" refer to memory boundaries of the operating system that are addressable via the memory management unit (MMU). Native memory boundaries of the operating system can be exposed to user space applications directly; the kernel does not need to parse network protocol data structures using the aforementioned read-write accesses. In some variants, transfers based on native memory boundaries enable "zero-copy" data transfers (where the processor does not copy data from one memory location to another memory location). Additionally, since each flow data structure is isolated from other flow data structures, flows do not block one another. Thus, flows may be released when they are ready rather than when e.g., a segment is fully packed with packets. More directly, the exemplary flow data structure prioritizes ease of access over compactness.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for managing a user space protocol stack, the method comprising:
   receiving, by a nexus in a kernel space, a packet from a packet pool, wherein the packet is associated with one or more flows, wherein the one or more flows are individually identified by corresponding one or more flow keys;
   extracting information from the packet to generate a flow key of the packet indicating a particular flow for the packet;
   looking up the flow key in a flow table to determine whether there is an existing flow key corresponding to an existing flow, and stored in the flow table matching the flow key of the packet;
   storing, responsive to the existing flow key matching the flow key of the packet, the packet into a batch of packets of the existing flow, wherein the batch of packets of the existing flow are stored in a flow-batched data structure; and
   releasing, responsive to a release condition being met, the batch of packets of the existing flow to the user space protocol stack within a user space application through a channel communicatively coupled to the nexus and the user space protocol stack.

2. The method of claim 1, further comprising:
   adding, responsive to no existing flow key stored in the flow table matching the flow key of the packet, the flow key of the packet to the flow table;
   generating a flow-batched data structure of the particular flow identified by the flow key of the packet; and
   storing the packet into the flow-batched data structure of the particular flow identified by the flow key of the packet.

3. The method of claim 1, further comprising:
   imposing a flow control on the released the batch of packets of the existing flow to manage a data transfer rate of the existing flow.

4. The method of claim 1, wherein the packet pool includes packets received by a network interface card (NIC) driver.

5. The method of claim 1, wherein the release condition includes an indication that all packets of the existing flow have arrived in the nexus, or a predetermined port event associated with the existing flow has occurred.

6. The method of claim 1, wherein the flow key includes protocol information, IP version information, source information for the flow, destination information for the flow, a source IP address, a destination IP addresses, a source port identifier, or a destination port identifier.

7. The method of claim 1, wherein the flow-batched data structure includes a metadata generated by hardware, or a metadata provided by the user space application.

8. The method of claim 7, wherein a first flow includes a first metadata, and a second flow includes a second metadata different from the first metadata.

9. The method of claim 1, wherein the flow-batched data structure includes a chain of packets or a super packet.

10. The method of claim 1, wherein the batch of packets stored in the flow-batched data structure of the existing flow is a first batch of packets stored in a first flow-batched data structure of a first existing flow; and the method further comprises:
    storing one or more packets into a second batch of packets stored in a second flow-batched data structure of a second existing flow; and
    releasing the first batch of packets stored in the first flow-batched data structure of the first existing flow without impacting the second existing flow.

11. The method of claim 1, wherein the packet of the packet pool is stored in one or more buffers of a network interface card (NIC), and the flow-batched data structure is stored in memory aligned with native memory boundaries of an operating system.

12. A system configured for managing packet flows, the system comprising:
    a storage device to store a flow table; and
    a processor coupled to the storage device, and configured to operate a nexus in a kernel space, wherein the nexus is configured to:
        receive a packet from a packet pool, wherein the packet is associated with one or more flows, wherein the one or more flows are individually identified by corresponding one or more flow keys;
        extract information from the packet to generate a flow key of the packet indicating a particular flow for the packet;
        look up the flow key in the flow table in the storage device to determine whether there is an existing flow key corresponding to an existing flow, and stored in the flow table matching the flow key of the packet;
        store, responsive to the existing flow key matching the flow key of the packet, the packet into a batch of packets of the existing flow, wherein the batch of packets of the existing flow are stored in a flow-batched data structure; and
        release, responsive to a release condition being met, the batch of packets of the existing flow to a user space protocol stack within a user space application through a channel communicatively coupled to the nexus and the user space protocol stack.

13. The system of claim 12, wherein the nexus is further configured to:
add, responsive to no existing flow key stored in the flow table matching the flow key of the packet, the flow key of the packet to the flow table;
generate a flow-batched data structure of the particular flow identified by the flow key of the packet; and
store the packet into the flow-batched data structure of the particular flow identified by the flow key of the packet.

14. The system of claim 12, wherein the nexus is further configured to:
impose a flow control on the released the batch of packets of the existing flow to manage a data transfer rate of the existing flow.

15. The system of claim 12, wherein the packet pool includes packets received by a network interface card (NIC) driver.

16. The system of claim 12, wherein the flow key includes protocol information, IP version information, source information for the flow, destination information for the flow, a source IP address, a destination IP addresses, a source port identifier, or a destination port identifier.

17. The system of claim 12, wherein the flow-batched data structure includes a metadata generated by hardware, or a metadata provided by the user space application.

18. The system of claim 12, wherein the flow-batched data structure includes a chain of packets or a super packet.

19. A non-transitory computer readable medium comprising computer programs stored thereon, when executed by a processor, cause a computerized apparatus to:
receive, by a nexus in a kernel space, a packet from a packet pool, wherein the packet is associated with one or more flows, wherein the one or more flows are individually identified by corresponding one or more flow keys;
extract information from the packet to generate a flow key of the packet indicating a particular flow for the packet;
look up a flow table in a storage device, based on the flow key, to determine whether there is an existing flow key corresponding to an existing flow, and stored in the flow table matching the flow key of the packet;
store, responsive to the existing flow key matching the flow key of the packet, the packet into a batch of packets of the existing flow, wherein the batch of packets of the existing flow are stored in a flow-batched data structure; and
release, responsive to a release condition is met, the batch of packets of the existing flow to a user space protocol stack within a user space application through a channel communicatively coupled to the nexus and the user space protocol stack.

20. The non-transitory computer readable medium of claim 19,
wherein the packet pool includes packets received by a network interface card (NIC) driver;
wherein the flow-batched data structure includes a metadata generated by hardware, or a metadata provided by the user space application; and
wherein the flow-batched data structure includes a chain of packets or a super packet.

\* \* \* \* \*